(12) United States Patent
Kampmeier et al.

(10) Patent No.: US 6,728,338 B1
(45) Date of Patent: Apr. 27, 2004

(54) UTILIZATION OF COMMUNICATION CHANNELS BETWEEN A CENTRAL OFFICE SWITCH AND A LAW ENFORCEMENT AGENCY

(75) Inventors: Eric Edward Kampmeier, Sycamore, IL (US); David B. Smith, Hinsdale, IL (US); Matthew Richard Smith, Hinsdale, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 360 days.

(21) Appl. No.: 09/708,801

(22) Filed: Nov. 8, 2000

(51) Int. Cl.[7] .......................... H04M 1/24; H04M 3/22; H04M 11/04
(52) U.S. Cl. ................... 379/35; 379/32.01; 379/32.04; 379/45; 379/133; 379/37
(58) Field of Search ................ 379/32.01, 35, 379/68, 85, 208.01, 211.01, 32.02, 32.03, 32.04, 37, 38, 45, 106.01, 106.11, 133

(56) References Cited

U.S. PATENT DOCUMENTS

| | | | | |
|---|---|---|---|---|
| 5,590,171 A | * | 12/1996 | Howe et al. ................. 379/33 |
| 5,920,611 A | * | 7/1999 | Howell ........................ 379/35 |
| 5,923,744 A | * | 7/1999 | Cheng ......................... 379/35 |
| 5,943,393 A | * | 8/1999 | Howell ........................ 379/35 |
| 6,229,887 B1 | * | 5/2001 | Albers et al. ................ 379/219 |
| 6,233,313 B1 | * | 5/2001 | Farris et al. | |
| 6,385,458 B1 | * | 5/2002 | Papadimitriou et al. ..... 455/456 |
| 6,418,208 B1 | * | 7/2002 | Gundlach et al. ........... 379/133 |
| 6,470,075 B1 | * | 10/2002 | Prieur ......................... 379/38 |

* cited by examiner

*Primary Examiner*—Huyen Le
*Assistant Examiner*—Quoc Tran

(57) ABSTRACT

A method and apparatus for conserving Communications Content Channels between a serving switching system and a Law Enforcement Agency premises. After a connection has been established between the serving switch and the Law Enforcement Agency premises using one of the Communications Content Channels, an Agent can transmit an indication that the communication is no-longer of interest; in response to receipt of that indication, the switch disconnects the call from the Communications Content Channel. Advantageously, this arrangement can reduce the number of Communications Content Channels required to monitor a particular target customer, and can overcome arrangements for flooding the Communications Content Channels with non-significant messages.

8 Claims, 3 Drawing Sheets

Figure 1:
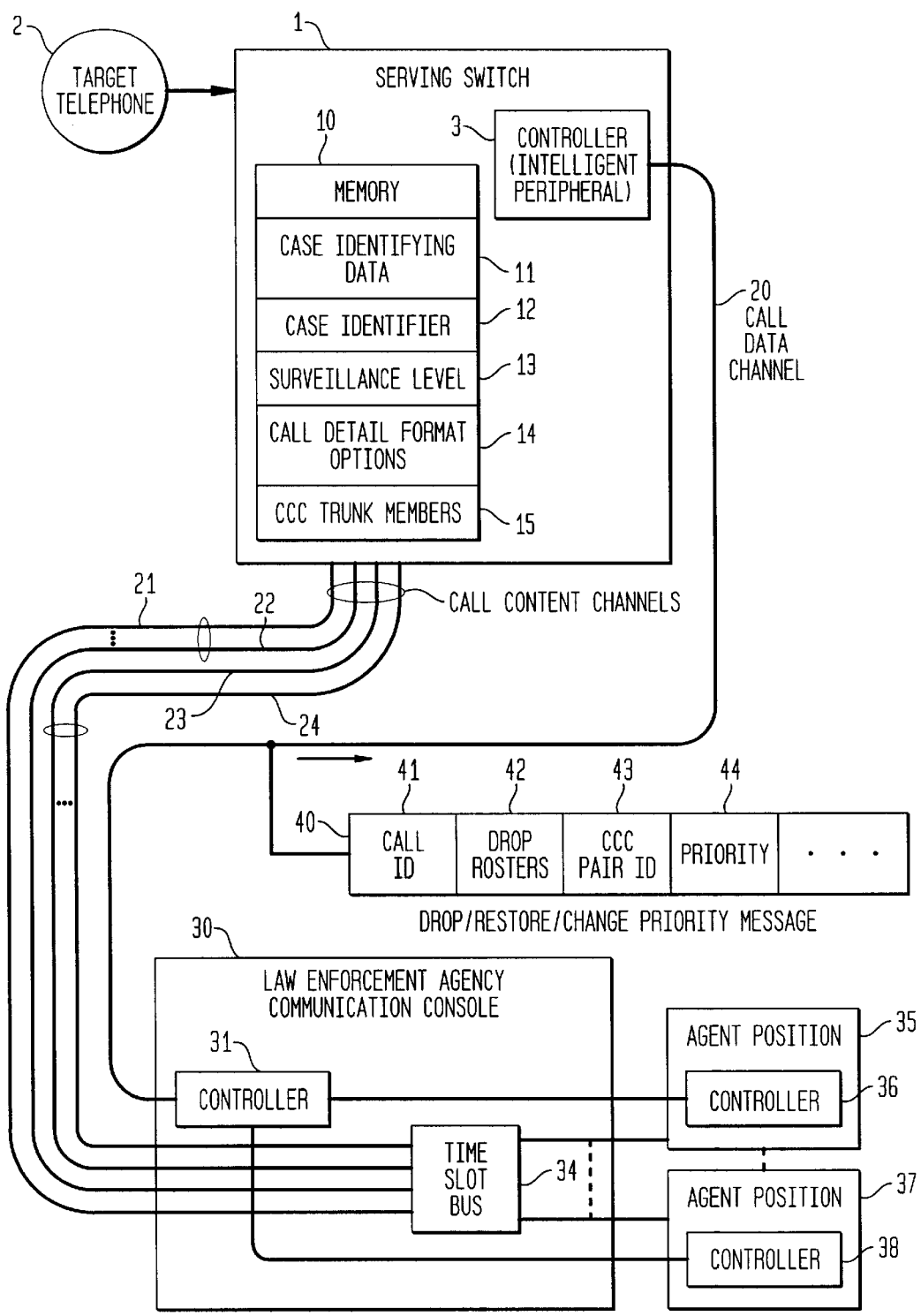

UTILIZATION OF COMMUNICATION CHANNELS BETWEEN A CENTRAL OFFICE SWITCH AND A LAW ENFORCEMENT AGENCY

TECHNICAL FIELD

This invention relates to utilization of communication channels between a central office telephone switch and a Law Enforcement Agency premises.

Problem

Law enforcement Agencies have found it necessary to intercept voice communications made for suspected illegal purposes. In the past, this was done through the process of attaching a wiretap to a telephone line which carried the telephone communication. Two types of interceptions are possible: the first, (Level 1), is used only for recording dialed information so that a record can be made of calls originated from a particular telephone; this has been enhanced in recent years to include the identity of a caller on an incoming call as well as the called party on outgoing calls. For cases in which probable cause is demonstrated to an appropriate judicial officer, a second level of interception is allowed in which a Law Enforcement Agency can actually listen and record the contents of the telephone communication.

The use of modern program controlled telephone switching systems, using digital telephone switching networks, has made it possible to implement the interception function more efficiently. At the same time, these systems have made it possible to have complex call configurations, which require that several telephone conversations from a single source may have to be monitored in order to intercept the key telephone communication.

In accordance with requirements specified by the Federal Communications Commission (FCC), a switching system is required to provide dedicated communications channels for each telephone customer whose communications are being intercepted at Level 2. In order to ensure that all of the communications from or to the targeted customer can be intercepted, a sufficient number of communications channels must be provided and dedicated between the central office switch serving the subject customer and a Law Enforcement Agency premises for the duration of the time that the customer's line is being monitored. A problem with the prior art is that the number of such communications channels which must be dedicated for that purpose is uneconomically large, as discussed below.

In accordance with the requirements for surveillance service imposed by the FCC, several calls can be in progress at the same time for one subject customer. One simple example is the following: suppose that the subject customer requests that subordinates call him/her and have such calls forwarded to a third number. The subject customer can thus set up a large number of such calls, (especially if the subject customer has a sufficient number of subordinates), subject only to call forwarding limitations of the switch. Then, when the subject customer believes that the Communications Content Channels dedicated to monitoring his communications have been exhausted, the subject customer can make the critical call, which will then not be monitored unless the subject customer has mis-guessed the number of Communications Content Channels dedicated to surveillance of his telephone. This call scenario helps to explain why a large number of Communications Content Channels are required, at least for certain subject customers, and why even a large number of such channels may be inadequate in accordance with the teachings of the prior art.

Solution

Applicants have analyzed this situation and have recognized that the agents can usually tell which of several communications from, to, or otherwise associated with the subject customer, are likely candidates for carrying the desired communication to be intercepted. Even so, in the prior art, the dedicated communication channels carrying subject content that is deemed to be of no value for the purpose of a criminal investigation, cannot be disconnected and made available for use by other calls for the entire duration of the monitored call, even though the Law Enforcement Agent has shut off recording of the content of the monitored call. These communication channels are in use from the perspective of the switch, but not from the perspective of the Law Enforcement Agency; they are a wasted resource.

In accordance with this invention, an improvement is made over the teachings of the prior art by giving agents responsible for monitoring Level 2 communications the power to release a channel carrying one of the communications when that agent recognizes that the communication is not one of interest. In accordance with Applicants' preferred embodiment, an agent can also request resumption of receipt of the content of the monitored call by making a reconnect request. Advantageously, the only channels that are required are the channels for carrying those communications that agents have identified as being of interest. Advantageously, arrangements by sophisticated lawbreakers to flood the communications channels for carrying their telephone communications to the Law Enforcement Agency premises can be defeated by this arrangement.

In accordance with one preferred embodiment of this invention, the signals from an agent to release a particular communications channel are sent over the signaling channel connecting the Law Enforcement Agency premises with the central office. This signaling channel can be an existing call data channel, or can be a separate administrative channel carrying only 1-way traffic for administrative messages. Advantageously, this provides a simple arrangement using currently installed equipment for communicating with the serving central office switch to release a particular communications channel.

In accordance with one preferred embodiment, each busy Communication Content Channel (CCC) is assigned a priority. This priority can be lowered if an Agent suspects that a communication is not of interest, so that a new higher priority communication can preempt the channel if no idle channels are available.

BRIEF DESCRIPTION OF THE DRAWINGS(S)

Figure 2:
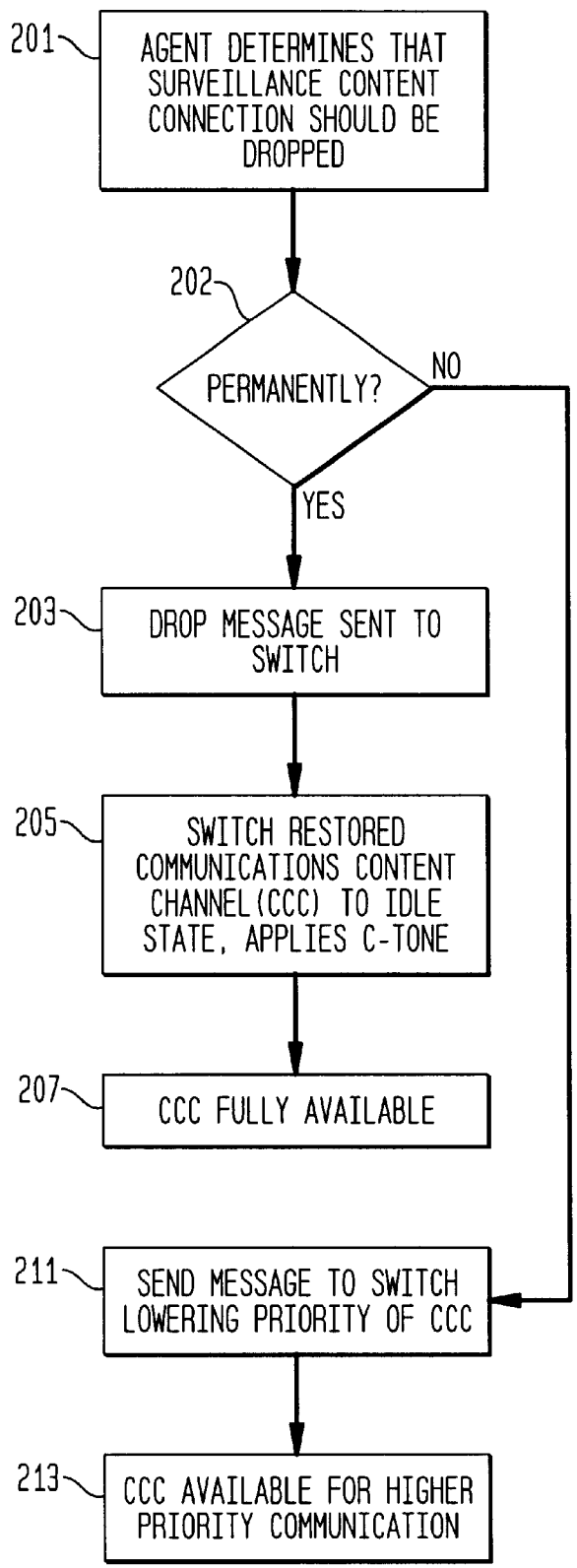
Figure 3:
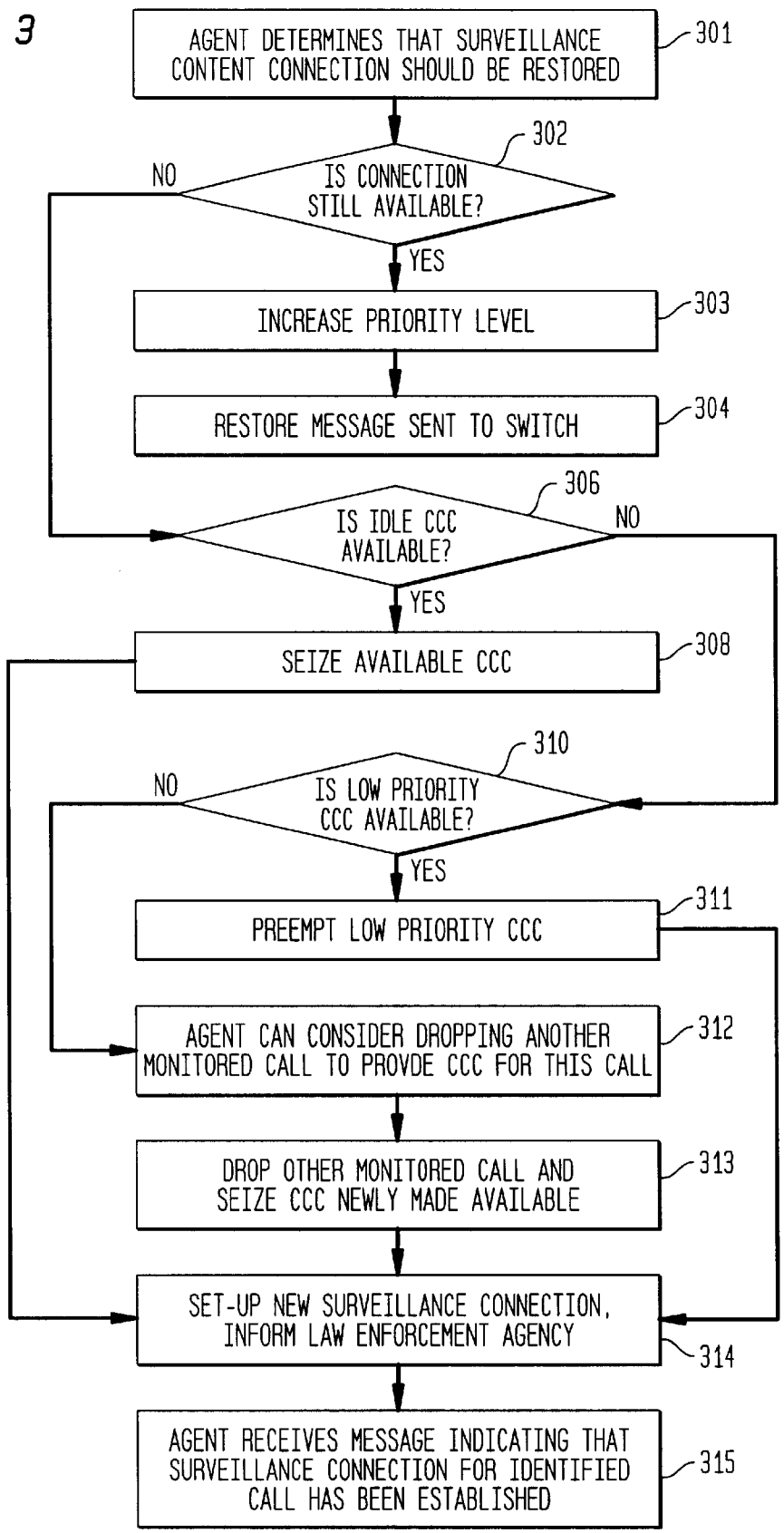

FIG. 1 is a block diagram illustrating the operation of Applicants' invention; and FIGS. 2 and 3 are flow diagrams illustrating the operation of Applicants' invention.

DETAILED DESCRIPTION

FIG. 1 is a block diagram illustrating the operation of Applicants' invention. The target customer telephone customer (2) is connected to a serving switch (1). The serving switch (1) includes a stored program controller (3) for controlling the operations of the system. The serving switch also includes a memory (4), which contains information about subject telephone customers. This information includes case identifying data (11), such as a case identifier (12), surveillance level (13), call detail formatting options (14), call content trunk members (15), etc. In addition, the serving switch maintains dynamic data for all communications being sent to the Law Enforcement Agency. For each such communication, a trunk number is stored, a unique call identity is preserved throughout the length of any telephone communication, and call information such as the calling and called telephone numbers, and call-flow information to indicate, for example, that an outside call is being forwarded.

The serving switch is connected to a Law Enforcement Agency Communication Console by a call data channel (20) and a plurality of Call Content Channels (CCC) 21, . . . , 22; . . . ; 23, . . . , 24. Each group of these Communication Content Channels, such as the group 21, . . . , 22 is dedicated to the communications of one subject telephone customer. In accordance with the principles of the prior art, the call data channel transmits data describing both Level 1 and Level 2 calls to the Law Enforcement Communication Console (30). This data includes call identifying information, answer indication, call redirection, origination, termination, calling and called party identification, time stamp, etc. (Details of these messages are not shown). In addition, in accordance with Applicants' invention, a data message such as data message (40) can be sent from the Law Enforcement Agency communications console (30) to the serving switch. This message contains the identity of the call (41), a signal of the required action, such as "drop", "drop permanently", or "restore" (42), priority indication (44), and optionally, the identity (43) of the Communications Content Channel for which the message is being sent. In response, for example, to a drop request, the serving switch will disconnect the subject telephone's content delivery trunk previously set up in accordance with the prior art, from the Communications Content Channel that was carrying that call to the Law Enforcement Communications Console without disturbing the subject's telephone connection. The Law Enforcement Communications Console contains a controller (31), which communicates with the controller (3) of the serving switch. This controller, an intelligent processor, sends messages about particular calls to agent positions, such as position (35), . . . , (37). The Law Enforcement Agency communications console (30) contains an interconnection network fabric such as a time-slot bus (34), or packet bus connected to each of the Agent positions. An Agent position selects the particular communication which the Agent wants to intercept by selecting an appropriate connection. The message from the controller to the agent position specifies the connection associated with a particular communication.

FIG. 2 is a flow diagram illustrating the Applicants' invention with respect to dropping a particular communication from connected Communications Content Channel (CCC). An Agent determines that a surveillance content connection should be dropped, (Action Block 201). Test 202 determines whether the agent wishes to drop off the call permanently (at least tentatively). If so, then in response to a signal from the Agent, the law enforcement communications console sends a drop message to the switch, (Action Block 203), to restore the CCC to idle. In response to receipt of the drop message, the switch restores the call communications channel to the idle state, and applies the C-tone (Continuity tone), which is applied to any idle CCC, (Action Block 205). The actions performed in Action Block 205 are the same kinds of actions performed in the prior art for restoring a CCC to the idle state. The CCC is then available for the next surveillance of the subject telephone. The CCC is then fully available.

If a content trunk (CCC) is not to be dropped permanently, (negative result of Test 202), the Agent sends a message to the switch to tag the trunk with a lower priority, (Action Block 211), and for the duration of the call will not be assigned unless and until there are no idle trunk(s) available. This will increase assurance that the same physical trunk will be available for the duration of the call, unless the trunk is preempted for a higher priority communication (Action Block 213). This is helpful to the Law Enforcement Agency. For example, an Agent may temporarily stop listening if the call in progress appears irrelevant; however, the agent may check periodically, and it is helpful if the same connection can be used. In some simple Law Enforcement Agency systems, individual communications terminate on fixed circuits; then, stopping and restarting is simplified.

FIG. 3 illustrates the operations of Applicants' invention with respect to a desired re-connect to a call previously dropped or whose priority level has been lowered. The Agent determines that surveillance content connection should be restored, (Action Block 301). Test 302 determines whether the connection is still available. If so, the priority level is increased, (Action Block 303). If the connection is not available, (the Agent had requested a permanent drop or a higher priority call had seized the CCC), then a restore message is sent to the switch, (Action Block 304). Test 306 is used to determine whether an idle CCC trunk is available. If so, the available trunk is seized, (Action Block 308). If no idle CCC trunk is available, then Test 310 is used to determine whether a CCC trunk with a low priority connection is available. If so, then the low priority CCC trunk is preempted, (Action Block 311), for the requested connection. Following Action Blocks 308 and 311, the Law Enforcement Agency console is informed, (Action Block 314). The Agent receives the message indicating that the surveillance connection for the identified call has been established and providing information to allow the agent to connect to the correct Communications Content Channel, (Action Block 315), by sending, for example, a CCC open request, amended to indicate that the CCC trunk is being established midcall. Action Blocks 314 and 315 are essentially identical to the actions performed in the prior art when a Communications Content Channel is opened.

If no low priority CCC trunk is available, (negative result of Test 311), the Agent is informed and can consider dropping another monitored call to provide a CCC trunk connection for this call, (Action Block 312). If the Agent makes such a decision, then the other monitored call is dropped and the newly available trunk is seized, (Action Block 313). Thereafter, Actions Blocks 314 and 315 are executed.

The above description is of one preferred embodiment of Applicants' invention. Many other embodiments will be apparent to those of ordinary skill in the art without departing from the scope of the invention. For example, many other signaling arrangements, (such as tones, packets, or DC signals carried on the CCC trunk from the Law Enforcement Agency to the switch, or an input/output message from the Surveillance Administration System (SAS) can be used for communicating an agent's request to drop or restore a communications content channel. The invention is only limited by the attached Claims.

What is claimed is:

1. A method of controlling usage of Communications Content Channels between an end office serving switch and a Law Enforcement Agency premises, comprising the steps of:

responsive to receipt of a call in said switch determining said call is to be content monitored;

in response to determining that the call is to be content monitored, establishing a connection between said switch and said Law Enforcement Agency premises over a Communications Content Camel (CCC);

in response to receipt of an indication from an Agent monitoring said call that it is not any longer necessary to receive the content of said call in said Law Enforcement Agency premises, making said CCC available for other calls;

wherein said switching system is further responsive to another indication from an agent at said Law Enforcement Agency premises, that a connection to the said call should be re-established, establishing a connection for said call between said call and said law enforcement agency premises.

2. A method of controlling usage of Communications Content Channels between an end office serving switch and a Law Enforcement Agency premises, comprising the steps of:

responsive to receipt of a call in said switch determining that said call is to be content monitored;

in response to determining that the call is to be content monitored, establishing a connection between said switch and said Law Enforcement Agency premises over a Communications Content Channel (CCC);

in response to receipt of an indication from an Agent monitoring said call that it is not any longer necessary to receive the content of said call in said Law Enforcement Agency premises, making said CCC available for other calls;

wherein the step of making a CCC available for other calls comprises the steps of:

reducing a priority of said connection over said CCC; and making said CCC available for a higher priority communication if no idle CCC is available.

3. The method of claim 2, further comprising the step of:

seizing a CCC by searching for an idle available CCC; and if no CCC is idle, preempting a lowest priority CCC if the lowest priority is less than a priority of said call.

4. A method of controlling usage of Communications Content Channels between an end office serving switch and a Law Enforcement Agency premises, comprising the steps of:

responsive to receipt of a call in said switch determining that said call is to be content monitored;

in response to determining that the call is to be content monitored, establishing a connection between said switch and said Law Enforcement Agency premises over a Communications Content Channel (CCC);

in response to receipt of an indication from an Agent monitoring said call that it is not any longer necessary to receive the content of said call in said Law Enforcement Agency premises, making said CCC available for other calls;

wherein the step of making said CCC available comprises the step of assigning a mini priority to said call, but maintaining said CCC connection until said call disconnects or until said CCC is preempted by a higher priority call.

5. A method of controlling usage of Communications Content Channels between an end office serving switch and a Law Enforcement Agency premise, comprising the steps of:

responsive to receipt of a call in said switch determining that said call is to be content monitored;

in response to determining that the call is to be content monitored, establishing a connection between said switch and said Law Enforcement Agency premises over a Communications Content Channel (CCC);

in response to receipt of an indication from an Agent monitoring said call that it is not any longer necessary to receive the content of said call in said Law Enforcement Agency premises, making said CCC available for other calls;

said method further comprising the step of:

controlling a priority of said CCC trunk from said Agent.

6. Apparatus for connecting an end-office serving switch and a Law Enforcement Agency premises comprising:

means, responsive to receipt of a call in said switch, for determining that said call is to be content monitored;

means, responsive to said means for determining, for controlling establishment of a connection between said switch and said Law Enforcement Agency premises over a communications content channel (CCC); and means, responsive to receipt of an indication from an Agent monitoring said call that it is no longer necessary to receive the content of said call in said Law Enforcement Agency premises, for making said CCC available for other calls;

wherein said switching system further comprises means responsive to another indication from an agent of said Law Enforcement Agency premises that a connection to said call should be re-established for establishing a connection over another CCC between said call and said Law Enforcement Agency premises.

7. Apparatus for connecting an end-office serving switch and a Law Enforcement Agency premises comprising:

means, responsive to receipt of a call in said switch, for determining that said call is to be content monitored;

means, responsive to said means for determining, for controlling establishment of a connection between said switch and said Law Enforcement Agency premises over a communications content channel (CCC); and means, responsive to receipt of an indication from an Agent monitoring said call that it is no longer necessary to receive the content of said call in said Law Enforcement Agency premises, for making said CCC available for other calls;

wherein said apparatus further comprises means responsive to another indication from said Agent for changing a priority of said call for said CCC.

8. The apparatus of claim 7, wherein said means for establishing a connection comprises means for establishing a connection using an idle CCC or a CCC with a lowest priority.

* * * * *